(12) United States Patent
Song et al.

(10) Patent No.: US 10,503,776 B2
(45) Date of Patent: Dec. 10, 2019

(54) IMAGE DISPLAY APPARATUS AND INFORMATION PROVIDING METHOD THEREOF

(71) Applicant: SAMSUNG ELECTRONICS CO., LTD., Suwon-si (KR)

(72) Inventors: In-jee Song, Seoul (KR); Seung-min Shin, Seoul (KR); Yong-hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/927,771

(22) Filed: Oct. 30, 2015

(65) Prior Publication Data
US 2016/0154824 A1    Jun. 2, 2016

(30) Foreign Application Priority Data

Nov. 28, 2014   (KR) .................. 10-2014-0168956

(51) Int. Cl.
  *G06F 16/58*   (2019.01)
  *H04N 21/44*   (2011.01)
  *H04N 21/4722*   (2011.01)
  *G09G 5/12*   (2006.01)
  *G09G 5/377*   (2006.01)
  *H04N 21/84*   (2011.01)

(52) U.S. Cl.
  CPC .............. *G06F 16/58* (2019.01); *G09G 5/12* (2013.01); *G09G 5/377* (2013.01); *H04N 21/44008* (2013.01); *H04N 21/4722* (2013.01); *H04N 21/84* (2013.01); *G09G 2340/12* (2013.01)

(58) Field of Classification Search
None
See application file for complete search history.

(56) References Cited

U.S. PATENT DOCUMENTS 8,204,918 B2   6/2012   Jung
8,922,716 B2   12/2014   An et al.
(Continued)

FOREIGN PATENT DOCUMENTS

CN   101377786   3/2009
CN   102685582   9/2012
(Continued)

OTHER PUBLICATIONS

Extended European Search Report dated Mar. 15, 2016 in corresponding European Patent Application No. 15195468.2, 6 pages.
(Continued)

Primary Examiner — Yi Wang
(74) Attorney, Agent, or Firm — Staas & Halsey LLP

(57) ABSTRACT

An image display apparatus includes a display displaying contents, a communicator communicating with a server, and a processor controlling the communicator to receive additional information for the displayed contents and an information providing rule from the server and providing target information corresponding to a context among the received additional information when the context corresponding to the information providing rule is generated while the contents are displayed on the display.

17 Claims, 15 Drawing Sheets

(56) References Cited

U.S. PATENT DOCUMENTS

| | | | |
|---|---|---|---|
| 8,937,664 B2 | 1/2015 | Kwon et al. | |
| 2008/0204595 A1 | 8/2008 | Rathod et al. | |
| 2009/0063586 A1 | 3/2009 | Jung | |
| 2012/0236161 A1 | 9/2012 | Kwon et al. | |
| 2012/0278821 A1* | 11/2012 | Tran | H04N 21/4508 719/328 |
| 2013/0044128 A1* | 2/2013 | Liu | G09G 5/00 345/633 |
| 2013/0198651 A1* | 8/2013 | Kim | G06F 3/0484 715/747 |
| 2013/0241952 A1* | 9/2013 | Richman | G06F 17/21 345/619 |
| 2013/0300934 A1* | 11/2013 | Cho | H04N 21/4788 348/500 |
| 2014/0007173 A1* | 1/2014 | Kim | H04N 21/236 725/114 |
| 2014/0147004 A1* | 5/2014 | Uchida | G06K 9/00442 382/103 |
| 2014/0267913 A1 | 9/2014 | An et al. | |

FOREIGN PATENT DOCUMENTS

| | | |
|---|---|---|
| CN | 104053034 | 9/2014 |
| EP | 2 523 466 | 11/2012 |
| WO | 2008/140270 | 11/2008 |
| WO | 2014/151883 | 9/2014 |

OTHER PUBLICATIONS

European Summons to Attend Oral Proceedings dated Dec. 14, 2018 in European Patent Application No. 15195468.2.

European Communication dated Jun. 8, 2018 in European Patent Application No. 15195468.2.

Consent—Draft recommendation ITU-T J.301 (J.arstv-req) "Requirements of Augmented Reality Smart Television System", Telecommunication Standardization Sector, XP044094687, Sep. 2014, 13 pages.

Chinese Office Action dated Jun. 27, 2019 in Chinese Patent Application No. 201510847726.3.

* cited by examiner

1000

IMAGE DISPLAY APPARATUS AND INFORMATION PROVIDING METHOD THEREOF

CROSS-REFERENCE TO RELATED APPLICATIONS

This application claims priority from Korean Patent Application No. 10-2014-0168956, filed on Nov. 28, 2014, in the Korean Intellectual Property Office, the disclosure of which is incorporated herein by reference in its entirety.

BACKGROUND

1. Field

Apparatuses and methods relate to an image display apparatus and an information providing method thereof, and more particularly, to an image display apparatus and an information providing method thereof capable of immediately providing information corresponding to displayed contents.

2. Description of the Related Art

Recently, an image display apparatus which may be used as a means of simply displaying broadcast contents may also have been used as a central apparatus of peripheral apparatuses by connection with various kinds of apparatuses, and may enable users to view various contents on a web through the Internet connection. Further, an image display apparatus such as a TV has evolved into a smart TV in which various applications are installed to enhance availability as well.

Therefore, the number of contents that may be used in the image display apparatus, such as contents provided from the image display apparatus itself and contents received from an external server, has increased.

Further, for user convenience, information corresponding to various kinds of contents may be displayed along with contents. However, the use of an external server or an apparatus storing an enormous amount of contents and information corresponding to the contents inconveniences a user wishing to use the contents and information for the contents.

Therefore, a scheme for using, by a user, information that is provided immediately while the contents are displayed has been required.

SUMMARY

Exemplary embodiments overcome the above disadvantages and other disadvantages not described above. Also, the embodiments are not required to overcome the disadvantages described above, and an exemplary embodiment may not overcome any of the problems described above.

An image display apparatus and an information providing method thereof capable of immediately providing information corresponding to displayed contents is provided.

According to an aspect, a display apparatus includes a display displaying contents, a communicator communicating with a server, and a processor controlling the communicator to receive additional information for the displayed contents and an information providing rule from the server and providing target information corresponding to a context among the received additional information when the context corresponding to the information providing rule is generated while the contents are displayed on the display.

The information providing rule may include information on whether to provide a content of information or information provided depending on the generated context.

The image display apparatus may further include a storage storing an information providing history, in which the processor may provide the target information corresponding to the context based on the stored information providing history, when the context corresponding to the information providing rule is generated.

The processor may not provide the target information even though the context corresponding to the information providing rule is generated, when the target information corresponding to the context is provided more often than a preset frequency or the target information is previously provided within a critical time, based on the stored information providing history.

The processor may control the communicator to generate query data based on metadata and profile information for the displayed contents and transmit the generated query data to the server.

The profile information used to generate the query data may include at least one of user information and positional information.

The processor may control the communicator to use the profile information used to generate the query data to update the query data and transmit the updated query data to the server.

The processor may determine whether the context is generated based on display information, subtitle information, and audio information of the displayed contents and user voice information input to the image display apparatus.

The processor may control the display to display the target information corresponding to the context along with the contents.

The processor may control the communicator to transmit the target information corresponding to the context to a preset user terminal.

According to another aspect, an information providing method of an image display apparatus includes displaying contents, receiving additional information for the displayed contents and an information providing rule from a server, and providing target information corresponding to the context among the received additional information when a context corresponding to the information providing rule is generated while the contents are displayed.

The information providing rule may include information on whether to provide a content of information or information provided depending on the generated context.

The information providing method may further include storing an information providing history, in which in the providing, the target information corresponding to the context may be provided based on the stored information providing history, when the context corresponding to the information providing rule is generated.

In the providing, the target information may not be provided even though the context corresponding to the information providing rule is generated, when the target information corresponding to the context is provided more often than a preset frequency or the target information is previously provided within a critical time, based on the stored information providing history.

The information providing method may further include generating query data based on metadata and profile information for the displayed contents and transmitting the generated query data to the server.

The profile information used to generate the query data may include at least one of user information and positional information.

The information providing method may further include updating the query data using the profile information used to generate the query data and transmitting the updated query data to the server.

The information providing method may further include determining whether the context is generated based on display information, subtitle information, and audio information of the displayed contents and user voice information input to the image display apparatus.

In the providing, the target information corresponding to the context may be displayed along with the contents to provide the target information.

The providing may further include transmitting the target information corresponding to the context to a preset user terminal.

There is provided a non-transitory computer readable medium recorded with a program code for executing the information providing method as described above.

According to another aspect, an image display apparatus includes a receiver configured to receive information associated with displayed contents and a request for information, and a processor searching for target information in the received information that meets the request for information immediately while the contents are displayed.

Additional and/or other aspects and advantages will be set forth in part in the description which follows and, in part, will be obvious from the description, or may be learned by practice.

BRIEF DESCRIPTION OF THE DRAWINGS

The above and/or other aspects will be more apparent by describing certain exemplary embodiments with reference to the accompanying drawings, in which.

DETAILED DESCRIPTION OF THE PREFERRED EMBODIMENTS

Hereinafter, various exemplary embodiments will be described in more detail with reference to the accompanying drawings. Further, when it is decided that a detailed description for the known function or configuration related to an embodiment may obscure the gist, the detailed description therefor will be omitted. Further, the following terminologies are defined in consideration of the functions of the embodiments and may be construed in different ways by the intention of users and operators. Therefore, the definitions thereof should be construed based on the contents throughout the specification.

Figure 1:
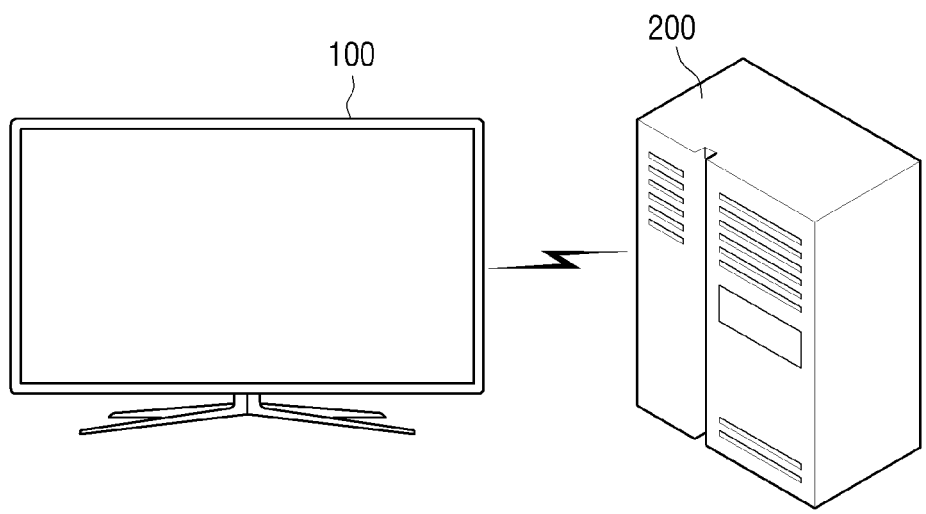
FIG. 1 is a block diagram illustrating an image display apparatus and a server according to an exemplary embodiment.

FIG. 1 is a diagram illustrating an image display apparatus 100 and a server 200 according to an exemplary embodiment. In detail, the image display apparatus 100 is a component for displaying contents. Further, the image display apparatus 100 may request information for displayed contents to a server 200 to receive additional information for contents to be displayed from the server 200. The additional information may include various information associated with contents.

Further, the image display apparatus 100 may analyze the displayed contents or sense surrounding environment to sense a generation of a context. The image display apparatus 100 may provide target information corresponding to the generated context, among the additional information received from the server 200.

That is, the image display apparatus 100 may generate query data based on metadata and profile information of the displayed contents and transmit the generated query data to the server 200. The profile information is information which is not changed for a predetermined time and may include user information.

The server 200 receiving the query data may extract additional information corresponding to contents based on the query data and transmit the extracted additional information to the image display apparatus 100. When a context is generated, the image display apparatus 100 receiving the additional information from the server 200 may provide target information corresponding to the generated context.

In particular, the server 200 may provide the additional information and an information providing rule to the image display apparatus 100. Therefore, when a context meeting the information providing rule is generated, the image display apparatus 100 may provide the target information corresponding to the generated context.

Meanwhile, a context means information for situations. That is, a context which may be generated from the image display apparatus displaying contents may include information which may be acquired from an inside and an outside of the image display apparatus displaying a content of the contents or the contents.

In detail, the context may include information such as display information, subtitle information, audio information, a kind of the contents, a subject, a producer, characters, viewing ages, playing time, a channel number, and a generation of a specific event which are included in the contents. Further, the context may include results of sensing surrounding environment. For example, the context may include user information for a user viewing contents, information acquired by analyzing a photographed image of the user or an input user voice, information for temperature, illumination, and humidity of a space in which the image display apparatus 100 is positioned, etc.

Meanwhile, the information providing rule is a rule as to whether to provide each additional information depending on what context is generated. For example, "information for character A" which is the additional information may be information provided in "the case in which the character A is first displayed in contents", "the case in which a user utters a name of the character A", and "the case in which a user searches for the character A using the image display apparatus within 24 hours". In this case, the "case in which the character A is first displayed in contents", "case in which a user utters a name of the character A", and "case in which a user searches for the character A using the image display apparatus within 24 hours" become the information providing rule for providing the "information for character A".

As illustrated in FIG. 1, the image display apparatus 100 may be a TV, which is only an example. Therefore, the image display apparatus 100 may be implemented as various electronic devices including a display such as a mobile phone, an LFD, a PDA, a tablet PC, a home theater, a digital camera, a camcoder, a notebook, a refrigerator, and a washing machine.

Meanwhile, the server 200 may store information for various kinds of contents. That is, the server 200 may collect and store additional information for various kinds of contents.

Further, the server 200 may generate the information providing rule, which is a rule providing each additional information, for the collected additional information. That is, the server 200 may generate the information providing rule as to whether to provide each additional information depending on what context is generated. Therefore, the server 200 may match the collected additional information with the information providing rule for each generated additional information and store the matched information.

Meanwhile, when receiving the query data from the image display apparatus 100, the server 200 may transmit the additional information for the contents to the image display apparatus 200. That is, the server 200 may analyze the received query data to determine the contents displayed by the image display apparatus 100 and extract the additional information corresponding to the corresponding contents and profile information and transmit the extracted additional information to the image display apparatus 100.

Hereinafter, the image display apparatus 100 for providing the foregoing information will be described in detail.

Figure 2:
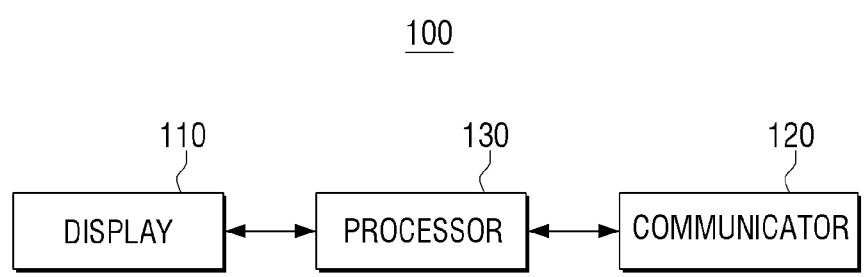
FIG. 2 is a block diagram schematically illustrating a configuration of the image display apparatus according to an exemplary embodiment.

FIG. 2 is a block diagram illustrating a configuration of the image display apparatus 100 according to the exemplary embodiment. As illustrated in FIG. 2, the image display apparatus 100 is configured to include a display 110, a communicator 120, and a processor 130.

The display 110 is a component for displaying contents. The display 110 may display contents received through a broadcast channel. That is, the image display apparatus 100 may also receive various kinds of broadcasting signals transmitted from a broadcasting station through an RF communication network and may also receive contents through an IP network from various kinds of servers and the display 110 may display the received contents. Displaying the received contents on the display 110 is only an example, and therefore the display 110 may also display pre-stored contents.

Further, the display 110 may display various UIs. In particular, the display 110 may display the target information corresponding to a context based on the additional information and the information providing rule which are received from the server 200. Meanwhile, the communicator 120 is configured to communicate with various types of external devices according to various types of communication schemes. The communicator 120 may include various communication modules such as a WiFi module, a Bluetooth module, and a near field communication (NFC) module. In this case, the WiFi module, the Bluetooth module, and the NFC module each perform communications in a WiFi scheme, a Bluetooth scheme, and an NFC scheme. Among them, the NFC module means a module operated in the NFC scheme using a band of 13.56 MHz among various RFID frequency bands such as 135 kHz, 13.56 MHz, 433 MHz, 860-960 MHz, 2.45 GHz, and the like. In the case of using the Wi-Fi module or the Bluetooth module, various connection information such as an SSID, a session key, and the like, is first transmitted and received and communication is connected by using the connection information. Then, various information may be transmitted and received.

In particular, the communicator 120 may perform communication with the server 200. That is, the communicator 120 may transmit the query data to the server and may receive the additional information corresponding to the contents and the information providing rule from the server 200.

In detail, the communicator 120 may transmit the query data generated based on the metadata and the profile information of the displayed contents to the server 200 by a control of the processor. Further, the communicator 120 may receive the additional information extracted based on the query data and the information providing rule of each additional information from the server 200. The processor 130 is generally configured to serve to control an apparatus. The processor 130 may be used as the same meaning as a central processing unit, a microprocessor, a control unit, etc. Further, the processor 130 may be implemented as a system-on-a-chip or a system on chip (SOC or SoC) along with other function units such as the communicator 120.

The processor 130 controls a general operation of the image display apparatus 100. In particular, the processor 130 may control the communicator 120 to receive the additional information for the contents displayed on the display 110 and the information providing rule from the server 200. Further, when a context corresponding to the information providing rule is generated, the processor 130 may provide the target information corresponding to the generated context among the received additional information.

In detail, the processor 130 may control the communicator 120 to generate the query data based on the metadata and the profile information for the displayed contents and transmit the generated query data to the server 200. Further, the processor 130 may control the communicator 120 to receive the additional information and information providing conditions generated based on the query data from the server 200.

When a context corresponding to the information providing rule is generated, the processor 130 may detect the target information corresponding to the generated context among the received additional information and provide the detected target information to the user.

Meanwhile, the profile information used to generate the query data means information which is not changed for a critical time. For example, the profile information may include user information for a user viewing the displayed contents or positional information for a position of the image display apparatus 100.

The processor 130 may update the profile information used to generate the query data at a preset period. That is, the processor may update the information for the user using the image display apparatus 100 at a preset period or update the positional information of the image display apparatus 100. For example, when the user information input or logged-in through the image display apparatus 100 is changed, the processor 130 may update the profile information to the information for the changed user.

The processor 130 may use the updated profile information to update the query data. Further, the processor 130 may control the communicator 120 to transmit the updated query data to the server 200.

Further, the processor 130 may control the display 110 to display the target information corresponding to the generated context along with the contents.

Further, the processor 130 may also control the communicator 120 to transmit the target information corresponding to the generated context to the preset user terminal. For example, the processor 130 may also control the communicator 120 to transmit the acquired target information to a smart phone used by the user viewing the displayed contents.

Figure 3:
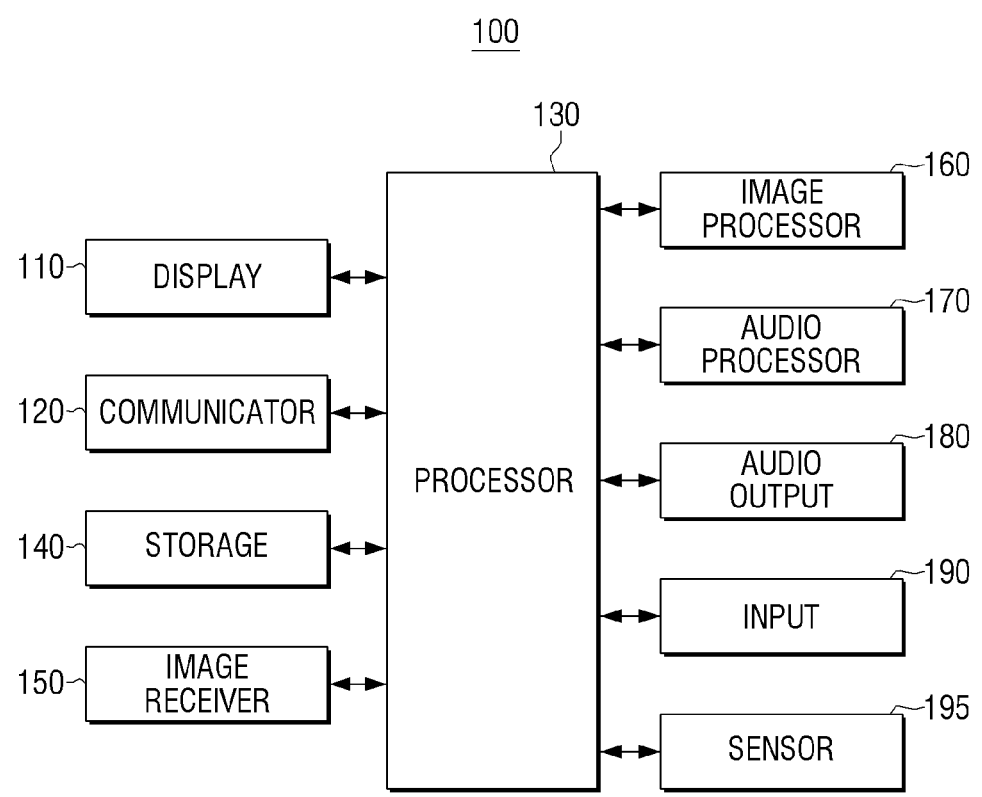
FIG. 3 is a block diagram illustrating in detail the configuration of the image display apparatus according to an exemplary embodiment.

Hereinafter, a configuration of the image display apparatus 100 will be described in more detail with reference to FIG. 3. FIG. 3 is a block diagram illustrating in detail the configuration of the image display apparatus according to the exemplary embodiment. As illustrated in FIG. 3, the image display apparatus includes the display 110, the communicator 120, the processor 130, a storage 140, an image receiver 150, an image processor 160, an audio processor 170, an audio output 180, an input 190, and a sensor 195.

Meanwhile, FIG. 3 generally illustrates, for example, various components, in the case in which the image display apparatus 100 is an apparatus including various functions such as a context acquisition function, an UI display function, a suspend to ram or suspend to disk function, a communication function, a moving picture playing function, and a display function. Therefore, according to the exemplary embodiment, some of the components illustrated in FIG. 3 may be omitted or changed and other components may also be added.

The display 110 is a component for displaying an image. The display 110 may display contents received through a broadcast channel. That is, the display 110 may display at least one of a video frame acquired by processing the image data received from the image receiver 150 to be described below by the image processor 160 and various screens generated by a graphics processor.

Further, the display 110 may display various UIs. In particular, the display 110 may extract the target information corresponding to the generated context among the additional information received from the server 200 and display the extracted target information using various types of UIs.

Meanwhile, the communicator 120 is configured to communicate with various types of external devices according to various types of communication schemes. The communicator 120 may include various communication modules such as a WiFi module, a Bluetooth module, and a near field communication (NFC) module.

In particular, the communicator 120 may perform communication with the server 200. That is, the communicator 120 may transmit the query data on the contents displayed on the display 110 to the server and receive the information corresponding to the contents from the server 200.

In detail, the communicator 120 may transmit the generated query data to the server 200 and receive the information transmitted from the server 200, by the control of the processor 130.

Meanwhile, the storage 140 stores various modules for driving the image display apparatus 100. For example, the storage 140 may store software including a base module, a sensing module, a communication module, a presentation module, a web browser module, and a service module. In this case, the base module is a basic module which processes signals transferred from each hardware included in the image display apparatus 100 and transfers the processed signals to an upper layer module. The sensing module, which is a module collecting information from various sensors and analyzing and managing the collected information, may include a face recognizing module, an audio recognizing module, a motion recognizing module, an NFC recognizing module, and the like. The presentation module is a module for configuring a display screen and may include a multimedia module which plays and outputs multimedia contents and an UI rendering module which performs UI and graphic processing. The service module is a module including various applications for providing various services.

As described above, the storage 140 may include various program modules some of which may be omitted, changed, or added according to a kind and characteristics of the image display apparatus 100. For example, when the image display apparatus 100 is implemented as the smart phone, the base module may further include a position determination module for determining a GPS based position and the sensing module may further include the sensing module for sensing an operation of a user.

Meanwhile, the storage 140 may store the additional information received from the server 200. In particular, the query data may be transmitted to the server 200 through the communicator 120 and when receiving the additional information corresponding to the display contents from the server 200, the storage 140 may store the received additional information.

Further, when the displayed contents end, the storage 140 may delete the additional information corresponding to the displayed contents stored. That is, when receiving additional information corresponding to new contents, the storage 140 may store newly received additional information by displaying new contents.

Meanwhile, the storage 140 may store an information providing history. That is, the storage 140 may store a providing history on information provided as the target information to the user.

Therefore, the processor 130 may not provide the target information even though the context corresponding to the information providing rule is generated, when the target information corresponding to the context is provided more often than a preset frequency or the target information is previously provided within a critical time, based on the information providing history stored in the storage 140.

Meanwhile, the image receiver 150 receives image data through various sources. For example, the image receiver 140 may receive broadcast data from an external broadcasting station, receive image data from an external server in real time, and receive the image data stored in the storage 140.

The image processor 160 is a component for processing the image data received by the image receiver 150. The image processor 160 may perform various image processing, such as decoding, scaling, noise filtering, frame rate conversion, and resolution conversion, on the image data.

The audio processor 170 is a component for performing processing on audio data. The audio processor 170 may perform various processing such as decoding, amplification, and noise filtering on the audio data. The audio data processed by the audio processor 170 may be output to the audio output 180.

The audio output 180 is a component for outputting various alarm sounds or voice messages in addition to various audio data which is processed by the audio processor 170. In this case, the audio output 180 may be implemented as a speaker, which is only an example and therefore may be implemented as an audio terminal.

Meanwhile, the input 190 is a component for receiving a user command. The input 190 receives the user command for controlling a general operation of the image display apparatus 100.

In this case, the input 190 may be implemented as a remote controller including a 4 way key of up, down, left, and right and a confirmation key, which is only an example. Therefore, the input may be implemented as various input devices such as a touch screen, a mouse, and a pointing device.

Further, the input 190 may receive a user command by a user voice. That is, the input 130 may include a component such as a mike to receive the user voice.

Meanwhile, the sensor 195 is a component for sensing surrounding environment. That is, various surrounding environment information sensed by the sensor 195 may be context information by the control of the processor 130. For example, the sensor 195 may include the mike (not illustrated) to sense the user voice and the processor 130 may analyze the sensed user voice to acquire a context. Alternatively, the sensor 195 may also include a camera (not illustrated) to sense a presence of a user or a change in an attitude, an expression, etc., of a user and the processor 130 may analyze a photographed image to acquire context information for a user.

Meanwhile, the processor 130 controls the general operation of the image display apparatus 100. In particular, the processor 130 may acquire the additional information for the displayed contents. Further, when a context is generated, the processor 130 may provide the target information corresponding to the generated context among the acquired additional information to a user.

In detail, the processor 130 may control the communicator 120 to generate the query data based on the metadata and the profile information for the displayed contents and transmit the generated query data to the server 200. Further, the processor 130 may control the communicator 120 to receive the additional information and information providing conditions generated based on the query data from the server 200.

When a context corresponding to the information providing rule is generated, the processor 130 may detect the target information corresponding to the generated context among the received additional information and provide the detected target information to the user.

Meanwhile, the profile information means information which is not changed for a critical time. For example, the profile information may include user information for a user viewing the displayed contents or positional information for a position of the image display apparatus 100.

The processor 130 may update the profile information at a preset period. That is, the processor may update the information for the user using the image display apparatus 100 at a preset period or update the positional information of the image display apparatus 100.

For example, when the user information logging-in the image display apparatus 100 is changed, the processor 130 may update the profile information to the changed user information.

The processor 130 may use the updated profile information to update the query data. Further, the processor 130 may control the communicator 120 to transmit the updated query data to the server 200.

The context may include the information for all situations which may be acquired by the processor 130 while the contents are displayed through the display 110. In detail, the processor 130 may extract the subtitle information displayed on the display 110 to acquire a context.

That is, the processor 130 may perform character recognition for the displayed image to acquire a context. For example, the processor 130 may capture the image displayed on the display 110 and perform optical character recognition (OCR) on the captured image to perform the character recognition. As a result of performing the character recognition, when a specific word is extracted as subtitle information, the processor 130 may acquire the extracted word as a context.

The processor 130 may analyze the image displayed on the display 110 in addition to the subtitle information to acquire various contexts.

For example, when the display image is an image for a specific area, the processor 130 may acquire information for the specific area as a context. Alternatively, when a specific character is included in the display image, the processor 130 may also acquire information for a specific character as a context.

Meanwhile, the processor 130 may acquire audio information included in the displayed contents as context information. In detail, when audio information corresponding to a preset specific word is output through the audio output 180, the processor 130 may extract the output specific audio information as a context.

Meanwhile, the processor 130 may use surrounding environment information sensed by the sensor 195 to extract a context. When a pre-registered user voice is input through the mike included in the sensor 195 but a pre-registered user face is photographed by the camera included in the sensor 195, the processor 130 may extract information for a presence of a specific user as a context.

Alternatively, as a result of analyzing the user voice input through the mike, when the preset specific word is input, the processor 130 may extract the specific word input as the user voice as a context.

When the contexts acquired by various methods including the above-mentioned methods satisfy the information providing rule received from the server 200, the processor 130 may detect the target information corresponding to the context. Further, the processor 130 may provide the detected target information.

Further, the processor 130 may control the display 110 to display the detected target information along with the contents.

Further, the processor 130 may also control the communicator 120 to transmit the detected target information to the preset user terminal. For example, the processor 130 may also control the communicator 120 to transmit the acquired target information to a smart phone used by the user viewing the displayed contents.

Meanwhile, the processor 130 may control the display 110 to display a setting menu for controlling the information providing function of the image display apparatus 100.

Figure 11:
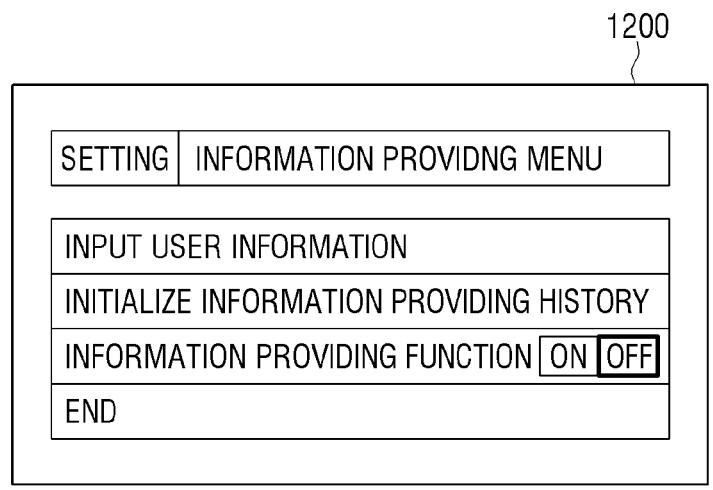
FIG. 11 is a diagram illustrating an appearance in which a setting menu of an information providing function is displayed, according to an exemplary embodiment.

In detail, as illustrated in FIG. 11, when an information providing menu 1200 for setting the information providing function is displayed, the user may perform setting such as a user information input, information providing history initialization and information providing function.

In detail, the user may receive the information for the user accessing the image display apparatus 100 and the server 200 through the user information input.

Further, the user may initialize the information providing history. That is, when a context corresponding to the information providing rule received from the server 200 is generated, if the target information corresponding to the generated context is stored in the information providing history as being provided to the user in advance, the target information may not be provided. Therefore, the user may initialize the information providing history to prevent whether to provide the target information from being changed by the information providing history.

Further, the user may control a turn on/off of the information providing function itself. When the user does not want to receive the target information or sufficiently receives the information, he/she may turn off the information providing function.

Meanwhile, the information providing menu 1200 illustrated in FIG. 11 is only one example. Therefore, a menu which may be set by the user may be changed through the information providing menu 1200.

The user may immediately receive the information corresponding to the contexts of the displayed contents by the image display apparatus 100 described above.

Figure 4:
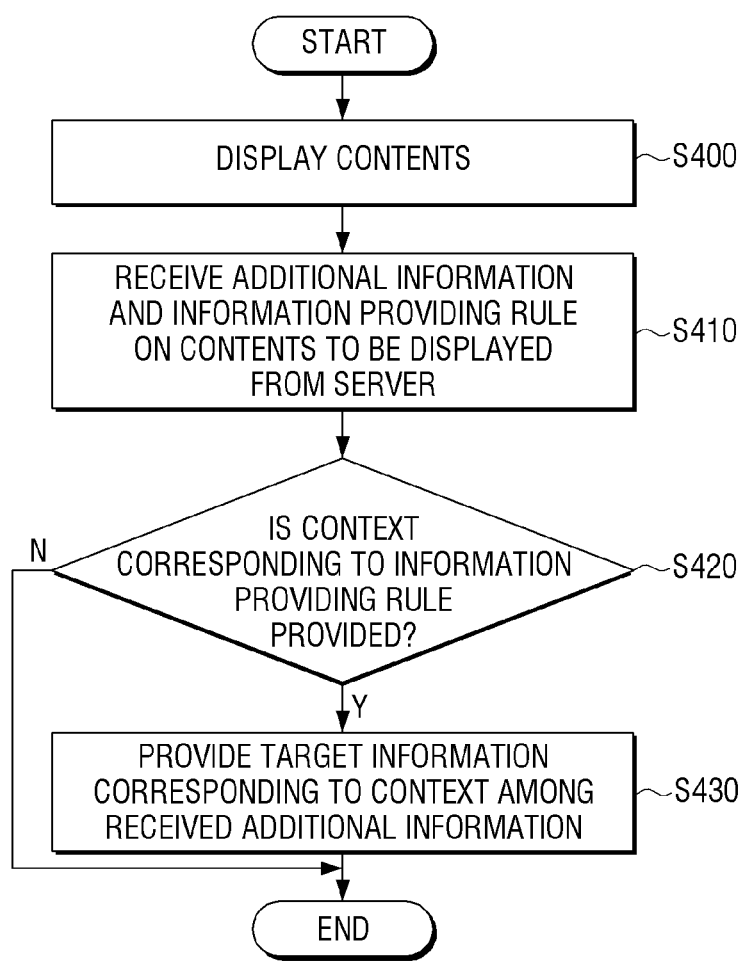
FIG. 4 is a flow chart illustrating a method for displaying information depending on a context of the image display apparatus according to an exemplary embodiment.

Meanwhile, FIG. 4 is a flow chart for describing in detail a method of displaying an image display apparatus 100 according to an exemplary embodiment.

First, the image display apparatus 100 displays contents (S400). The contents may be broadcasting contents but is only an example. Therefore, the contents may be various multimedia contents including contents associated with various applications, contents such as movie and music downloaded through various kinds of communication networks.

The image display apparatus 100 receives the additional information for displayed contents and the information providing rule from the server 200 (S410). That is, the image display apparatus 100 may receive various additional information associated with the displayed contents and the information providing rule which is a rule for providing each additional information from the server 200.

When a context corresponding to the information providing rule is generated (S420-Y), the image display apparatus 100 provides the target information corresponding to the context among the received additional information (S430). That is, when a context corresponding to a predetermined rule is generated, the image display apparatus 100 may extract the target information corresponding to the context generated from the additional information received from the server 200 and provide the extracted target information.

For example, for baseball game contents, among additional information, 'records of player A and player B taking part in the Beijing Olympics in 2008' may consider the case in which the 'player A' and the 'player B' are simultaneously displayed in the display image over 5 minutes as an information providing condition. Therefore, while the image display apparatus 100 displays baseball ball contents, when a context that the 'player A' and the 'player B' are simultaneously displayed over 5 minutes is generated, the image display apparatus 100 may provide the 'records of player A and player B taking part in the Beijing Olympics in 2008' as target information.

The image display apparatus 100 may display the target information for the display screen by overlapping the target information with contents. Alternatively, the image display apparatus 100 may also output the acquired additional information as audio data through the speaker. The image display apparatus 100 may use various methods which may transfer additional information to a user, in addition to the foregoing method.

Figure 5:
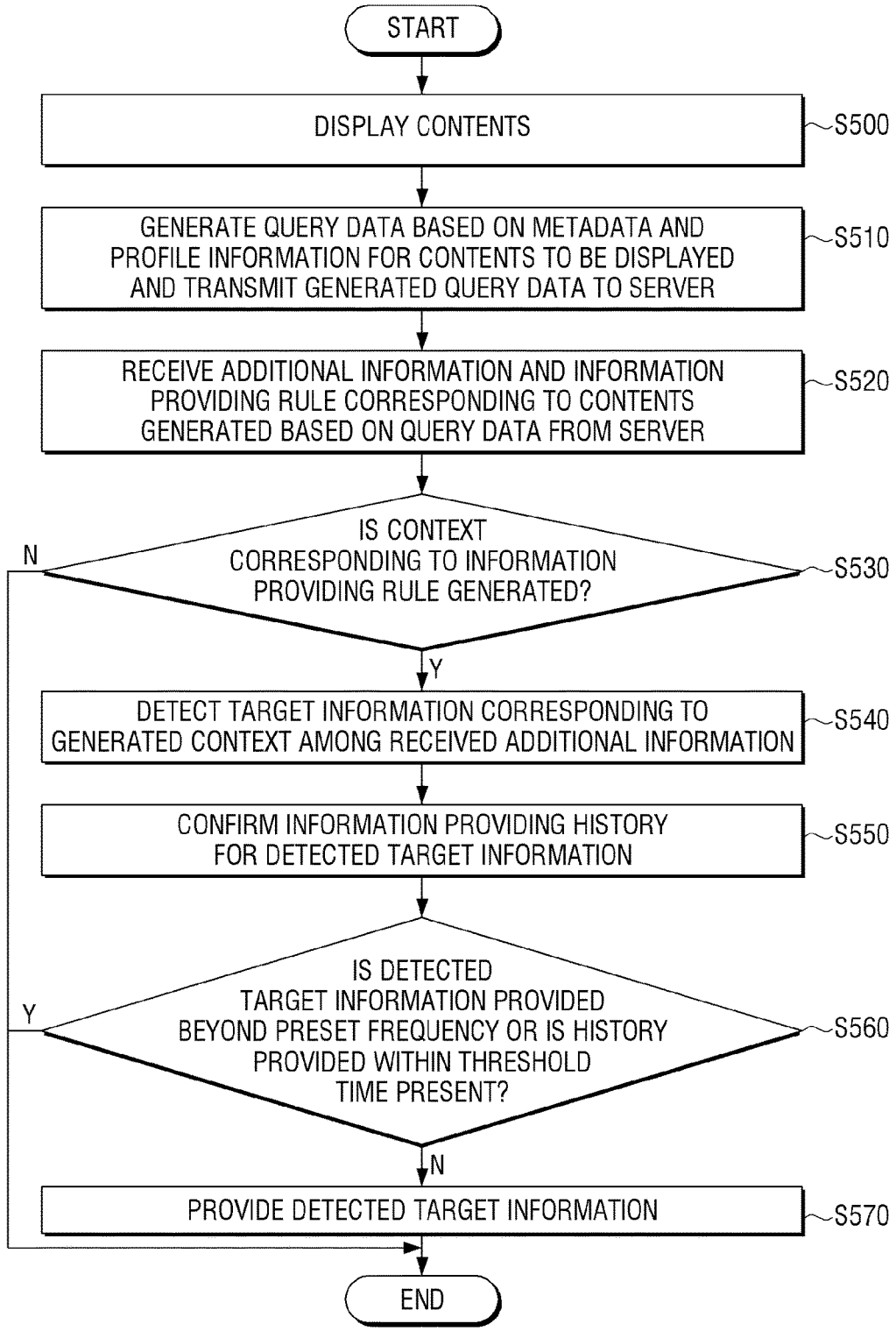
FIG. 5 is a flow chart illustrating in detail a method for acquiring, by the image display apparatus, additional information by performing communication with an external server 200 according to an exemplary embodiment.

Meanwhile, FIG. 5 is a flow chart for describing a detailed method for acquiring additional information by bringing the image display apparatus 100 into communication with the server 200. First, the image display apparatus 100 displays contents (S500). Further, the image display apparatus 100 may generate the query data based on metadata and profile information of the displayed contents and transmit the generated query data to the server 200.

The metadata means various information to let a user to know what contents are. For example, the metadata may include information such as a title, a director, characters, a subject, a kind, etc., of contents.

The profile information means information which is not changed for a critical time. That is, the profile information includes user information for a user viewing the displayed contents or positional information for a position of the image display apparatus 100. For example, the profile information may be information for a logged-in user.

The image display apparatus 100 may generate the query data based on the metadata and the profile information and transmit the generated query data to the server 200. The image display apparatus 100 may update the query data depending on the preset period or the user command.

For example, when the logged-in user information is changed, the image display apparatus 100 may update the query date based on the changed profile information. Therefore, when the query data are updated, the image display apparatus 100 may transmit the updated query data to the server 200.

The server 200 may store information corresponding to various kinds of contents. Further, the server 200 may generate the information providing rule which is a rule for providing each additional information. Therefore, the server 200 may store information corresponding to contents, each of the plurality of additional information, and the information providing rule.

The server 200 receiving the query data for the contents may extract the additional information corresponding to the contents among the plurality of stored additional information and the information providing rule based on the query data and transmit the extracted additional information to the image display apparatus 100.

That is, the image display apparatus 100 receives the additional information corresponding to the contents generated based on the query data and the information providing rule from the server 200 (S520).

When a context corresponding to the information providing rule is generated (S530-Y), the image display apparatus 100 detects the target information corresponding to the generated context among the received additional information (S540).

In detail, the image display apparatus 100 may analyze the displayed contents to acquire a context for the contents. That is, the image display apparatus 100 may in real time acquire a context which may be acquired while contents are displayed.

The context means information for situations. That is, a context which may be generated from the image display apparatus displaying contents may include information which may be acquired from an inside and an outside of the image display apparatus displaying a content of the contents or the contents.

In detail, the context may include information such as display information, subtitle information, audio information, a kind of the contents, a subject, a producer, characters, viewing ages, playing time, a channel number, and a generation of a specific event which are included in the contents. Further, the context may include results of sensing surrounding environment. For example, the context may include user information for a user viewing contents, information acquired by analyzing a photographed image of the user or an input user voice, information for temperature, illumination, and humidity of a space in which the image display apparatus 100 is positioned, etc.

When the generated context satisfies a specific information providing rule, the image display apparatus 100 may detect the target information for the generated context from the received additional information.

Further, the image display apparatus 100 confirms the information providing history for the detected target information (S550). That is, the image display apparatus 100 may store, as the information providing history, a providing history for information provided to a user as the target information.

Therefore, the image display apparatus 100 determines whether the target information detected based on the information providing history is provided more often than a preset frequency or there is a previously provided history within a critical time (S560).

As the determination result, when the detected target information is not provided to the information providing history more often than the preset frequency and there is not a history provided within a critical time (S560, N), the image display apparatus 100 provides the detected target information (S570).

That is, in the image display apparatus 100 even when the context corresponding to the information providing rule is generated to detect the target information for the generated context, if it is determined as the confirmation result based on the information providing history that the detected target information is provided more often than a preset frequency or there is a previously provided history within a critical time, the detected target information is not provided.

In detail, the example in which the context that the 'player A' and the 'player B' are simultaneously displayed in the display image of baseball game contents over 5 minutes is generated to allow the image display apparatus 100 to provide the 'records of player A and player B taking part in the Beijing Olympics in 2008' as the target information among the additional information will be described.

When the context that the 'player A' and the 'player B' are simultaneously displayed over 5 minutes is generated from the additional information for the baseball game contents received from the server 200, the image display apparatus 100 may extract the 'records of player A and player B taking part in the Beijing Olympics in 2008' as the target information corresponding to the generated context.

Further, the image display apparatus 100 may analyze the information providing history to determine whether the 'records of player A and player B taking part in the Beijing Olympics in 2008' is provided within a critical time.

That is, when the case in which the 'player A' and the 'player B' are frequently displayed simultaneously over 5 minutes, if the 'records of player A and player B taking part in the Beijing Olympics in 2008' is displayed or output as audio data, the user may rather feel inconvenience.

Therefore, if it is determined that the 'records of player A and player B taking part in the Beijing Olympics in 2008' is provided in advance while the baseball game contents are displayed or provided within a critical time (for example, 1 hour) by the information providing history, the image display apparatus 100 may not provide the 'records of player A and player B taking part in the Beijing Olympics in 2008' as the target information.

Meanwhile, the image display apparatus 100 may provide the detected target information to a user as video or audio. For example, the image display apparatus 100 may display the detected target information for the display 110 along with the displayed contents. However, this is only an example. Therefore, the image display apparatus 100 may output the target information detected in various forms such as outputting the target information through the audio output 180. Hereinafter, the case in which the image display apparatus 100 displays a baseball game of team A and team B will be described in detail with reference to FIGS. 6 and 7.

Figure 6:
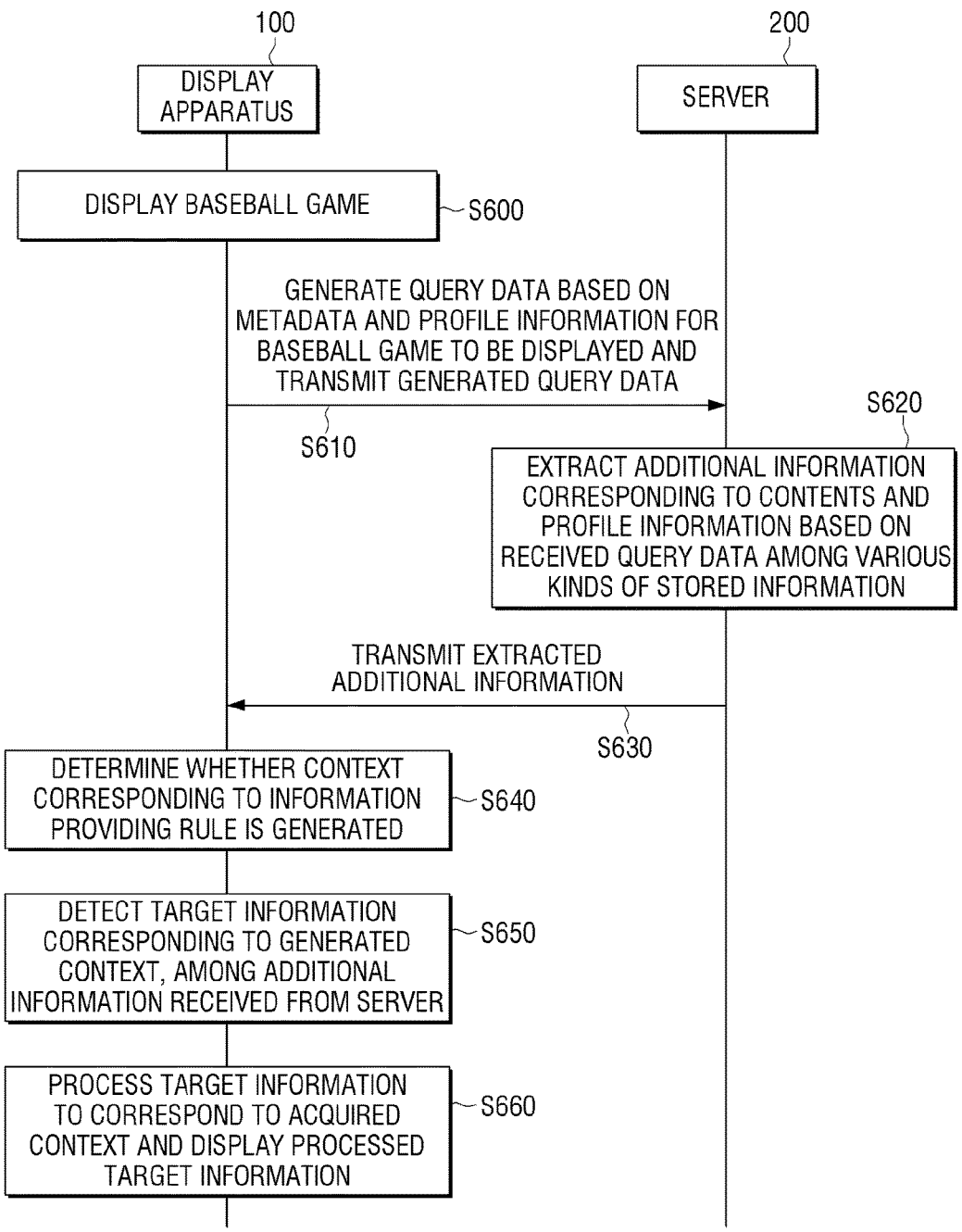
FIG. 6 is a flow chart illustrating a method for receiving information depending on various kinds of contexts of a baseball game and displaying information depending on a context according to an exemplary embodiment.

FIG. 6 is a sequence diagram illustrating a method for displaying target information corresponding to a context among the additional information received from the server 200 when the image display apparatus 100 displays the baseball game of the team A and the team B.

First, the image display apparatus 100 displays the baseball game (S600). That is, the image display apparatus 100 may display the baseball game by the user command.

Further, the image display apparatus 100 may generate the query data based on metadata and profile information of the displayed baseball game and transmit the generated query data to the server 200. The metadata means information to let a user to know what contents are displayed.

Further, the profile information is information which is not changed for a critical time. For example, when the displayed baseball game is 'game between team A and team B' and is performed in 'stadium X', the 'team A', 'team B', and 'stadium X' may be metadata.

According to the logged-in user information, the information that a user viewing contents is a man in his 20 and the 'team A' is preferred may be the profile information.

Therefore, the image display apparatus 100 may generate query data based on metadata of 'team A', 'team B', and 'stadium X' and the profile information of the 'preference of team A', '20s', and Than information' and transmit the generated query data to the server 200.

The server 200 extracts additional information corresponding to contents and the profile information based on the received query data among various kinds of stored information (S620). That is, the server 200 may extract information for 'records of team A and team B', 'players belonging to team A and team B', 'records held by players belonging to team A and team B', 'various kinds of new records of Korean baseball', 'record established in a baseball stadium of city C', 'event generated from a baseball stadium of city C', 'preference of a man in his 20s', etc.

Further, the server 200 may generate then information providing rule which is a rule for providing each additional information stored. That is, the server 200 may generate the information providing rule which is a rule as to whether to provide each additional information depending on what context is generated. For example, the server 200 may generate the information providing rule which provides additional information for the 'various kinds of new records of Korean baseball' when 'the case in which a new record is established during the game' and 'collection of various kinds of records' contexts are generated.

Further, the server 200 transmits the extracted additional information to the image display apparatus 100 along with the information providing rule (S630).

The image display apparatus 100 determines whether the context corresponding to the information providing rule is generated (S640). In detail, the image display apparatus 100 analyzes a displayed baseball game screen to determine whether the context corresponding to the information providing rule is generated by using a player appearing on a screen, an event generation content, a displayed text, etc.

For example, the image display apparatus 100 may analyze the display image to extract characters or subtitle. Further, the image display apparatus 100 may also analyze the output audio data to extract a specific word.

In detail, the image display apparatus 100 may analyze characters included in the captured image to determine whether a character is 'player X' and analyze the displayed text and the output audio data to determine whether a 'home run' event is generated.

The image display apparatus 100 detects the target information corresponding to the generated context among the additional information received from the server 200 (S650) and processes and displays the detected information to correspond to the acquired context (S660).

That is, the image display apparatus 200 may detect the target information matching 'generation of a home run event of player X' which is the extracted content, among additional information for the 'records of team A and team B', the 'players belonging to team A and team B', the 'records held by players belonging to team A and team B', the 'various kinds of new records of Korean baseball', the 'record established in a baseball stadium of city C', the 'event generated from a baseball stadium of city C', etc., which are received from the server 200.

For example, when the 'generation of a home run event of player X' is generated as a context, the image display apparatus 100 may provide target information such as the 'record held by player X' and 'new home run record of Korean baseball' corresponding to the 'generation of a home run event of player X'.

Further, the image display apparatus 100 may display the target information detected on a portion of the display. In particular, the image display apparatus 100 may process and display the detected information to harmonize with the displayed image. For example, the image display apparatus 100 may display the information for the detected 'record held by player X' so that the information moves with the movement of the 'player X' while being displayed near the 'player X'.

According to the above-mentioned method, the image display apparatus 100 may immediately provide the information corresponding to the context.

Meanwhile, when the 'record held by player X' and the 'new home run record of Korean baseball' are provided as the target information, the image display apparatus 100 may store a history provided as the target information in the information providing history.

Therefore, when the context suitable to provide the 'record held by player X' and the 'new home run record of Korean baseball' as the target information is generated, the image display apparatus 100 may determine whether to provide the target information based on the information providing history.

For example, the image display apparatus 100 may store a provided history about the 'record held by player X' and the 'new home run record of Korean baseball' in the information providing history and may not provide the same information for the critical time.

Figure 7:
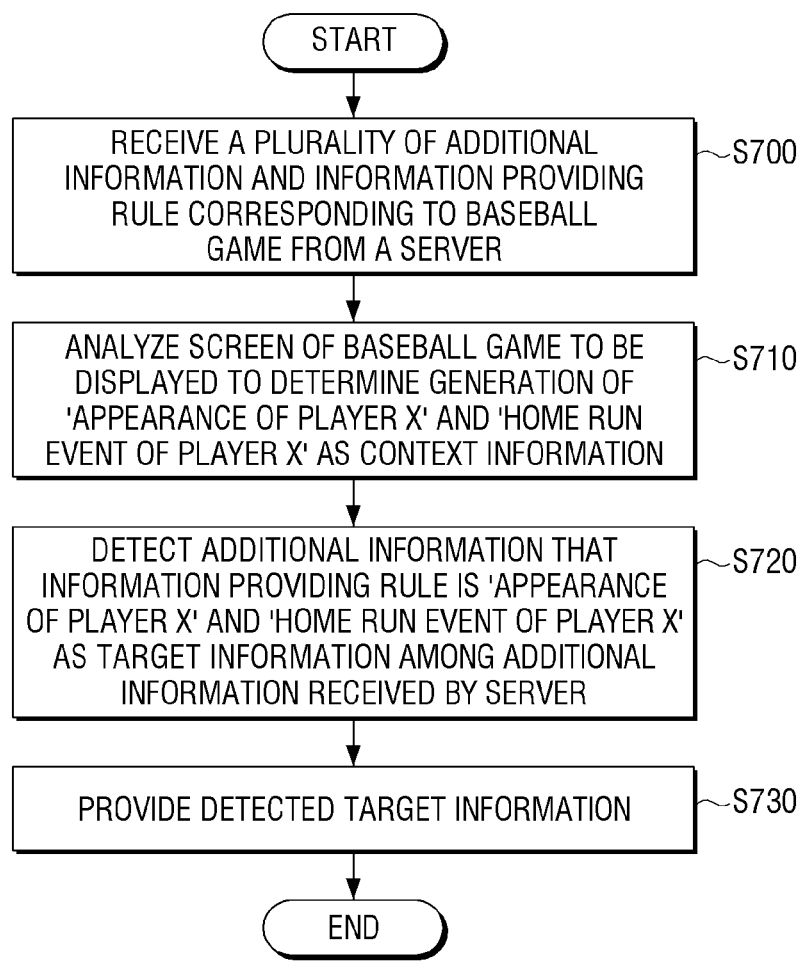
FIG. 7 is a flow chart illustrating a method for extracting information depending on a context according to an exemplary embodiment.

Meanwhile, FIG. 7 is a flow chart for describing in detail a method for extracting information to allow the image display apparatus 100 to immediately provide the information corresponding to the context of the baseball game as illustrated in FIG. 6.

First, the image display apparatus 100 receives a plurality of additional information corresponding to the baseball game and the information providing rule from the server 200 (S700).

That is, the server 200 may collect data at a preset time interval and store information for various kinds of contents. For example, the server 200 may collect information for a record of a baseball game played in all parts of the world such as Korea, Japan, and U.S., an event generated from each game, and a newly established record in each game by a player or a team and update the information for the baseball game.

The image display apparatus 100 may use the 'baseball game between team A and team B' in 'stadium C' of Korea as metadata and use the information for the 'user is a man in his 20s' as the profile information in the server 200 to generate the query data and transmit the generated query data to the server 200. Further, the image display apparatus 100 may receive the information for the 'baseball game between team A and team B' from the server 200 receiving the query data.

That is, the image display apparatus 100 transmits the query data to the server 200 without performing an operation of collecting and updating various information at a preset time interval, thereby quickly receiving the information for the displayed contents.

Further, the image display apparatus 100 may analyze the displayed baseball game screen to determine the generation of the 'appearance of player X' and the 'generation of a home run event of player A' using the context information (S710).

In detail, the image display apparatus 100 may analyze the display image to determine the character included in the image and may perform the optical character recognition (OCR), etc., on a text included in the image to extract the text. Further, the image display apparatus 100 may also analyze the output audio data to extract the specific word.

For example, the image display apparatus 100 may analyze the character included in the display image to determine that the character is the 'player X'. Alternatively, the image display apparatus 100 may analyze the output audio to determine that the character is the 'player X' when the audio data called the 'player X' is extracted from an announcement of a commentator output as audio during the baseball game.

Further, when a word called 'home run' is displayed as a text, the image display apparatus 100 may perform the OCR, etc., on the display image to extract the displayed text 'home run' and determine that the home run' event is generated. Alternatively, the image display apparatus 100 may detect that the audio data called 'home run' among the announcement of the commentator output as audio during the baseball game is output and determine that the 'home run' event is generated.

Therefore, the image display apparatus 100 detects additional information corresponding to an appearance timing of the 'player X' and the additional information for the 'home run' event among the additional information received by the server 200 as the target information (S720).

For example, the image display apparatus 100 may detect 'record of player X last season', 'record of player X this season', 'information associated with a team to which player X belongs', 'event generated for player X', 'all-time new home run record of Korea professional baseball', 'record for a player holding most home runs this season', 'record difference between a player holding most home runs this season and player X', etc., as the target information.

Further, the image display apparatus 100 provides the detected target information (S730). For example, the image display apparatus 100 may display the extracted additional information in a portion of the display. In particular, the image display apparatus 100 may process and display the detected additional information to harmonize with the displayed image. For example, the image display apparatus 100 may display the information for the detected 'record of player X this season' so that the information moves with the movement of 'player X' while being displayed near 'player X'.

Figure 8A:
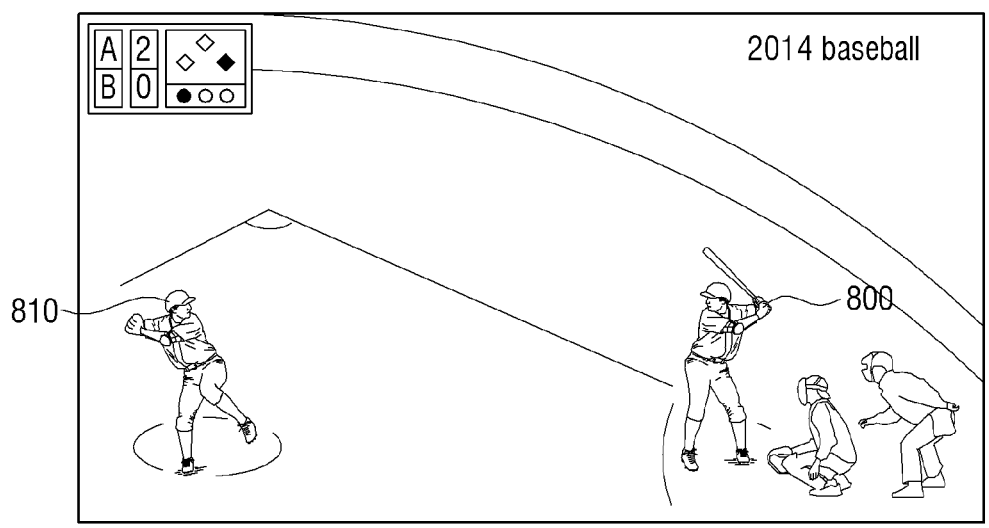
FIGS. 8A and 8B are diagrams illustrating an appearance in which when at least two players appear in a baseball game, information associated with the players is displayed, according to an exemplary embodiment.
Figure 8B:
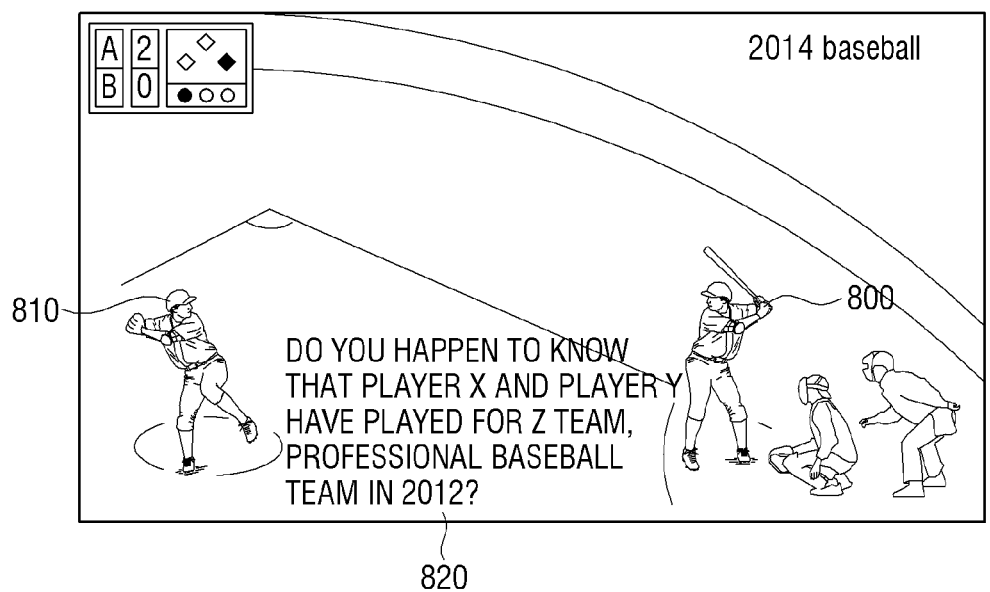

Meanwhile, FIGS. 8A and 8B are diagrams for describing a method for displaying target information as an UI while baseball gate contents are displayed, according to the exemplary embodiment.

When starting to display the baseball game, the image display apparatus 100 may transmit the query data generated based on the metadata and the profile information for the baseball game to the server 200. That is, the image display apparatus 100 may transmit a title, a genre, a subject, and a kind of the displayed contents, information for a user, etc., to the server 200 as the query data.

Therefore, the image display apparatus 100 may transmit the query data generated by using the information that the displayed baseball game is a game of 'team A and team B' and the baseball game is played in 'stadium in city C' as the metadata and using the information called 'a man in his 20s is a user' as the profile information to the server 200.

That is, the server 200 receiving the query data may extract information for the 'records of team A and team B', the 'players belonging to team A and team B', the 'records held by players belonging to team A and team B', 'event between players belonging to team A and team B', ' various kinds of new records of Korean baseball', 'record established in a baseball stadium of city C', 'event generated from a baseball stadium in city C', 'preference of a man in his 20s', etc., from the pre-stored additional information.

Further, the server 200 may simultaneously extract the information providing rule which is a rule for providing each additional information. That is, the server 200 generates the information providing rule which is a rule as to whether to provide the additional information at the generation timing of any context.

For example, the server 200 may generate 'case in which at least two players simultaneously appear within a critical time' as an information providing rule for providing the information for 'event between players belonging to team A and team B'. The server 200 may transmit the extracted information to the image display apparatus 100.

The image display apparatus 100 receiving the information may analyze the displayed baseball game image at a preset time interval. That is, the image display apparatus 100 may analyze the display image to acquire a context.

That is, the image display apparatus 100 may analyze the display image as illustrated in FIG. 8A to acquire a context called 'player who is currently at bat is hitter X' and 'pitcher is player Y'.

Therefore, the image display apparatus 100 may determine that the context that 'player X 800' and 'player Y 810' simultaneously appear satisfies the case in which 'at least two players simultaneously appear within a critical time' among the information providing conditions.

Further, the image display apparatus 100 may provide, as the target information, the case in which the 'player X 800' and the 'player Y 810', which is the additional information corresponding to the context that the 'player X 800' and the 'player Y 810' satisfying the information providing rule simultaneously appear, 'belong to the same team in 2012' among the plurality of additional information received from the server 200.

Further, the image display apparatus 100 may display the target information for a portion of the display 110 as the UI, but as illustrated in FIG. 8B, may process and display the extracted information.

For example, the image display apparatus 100 may display Do you happen to know that player x and player y have played for z team, professional baseball team in 2012?', which is a text UI corresponding to the target information, between the 'player X 800' and the 'player Y 810'.

Figure 9A:
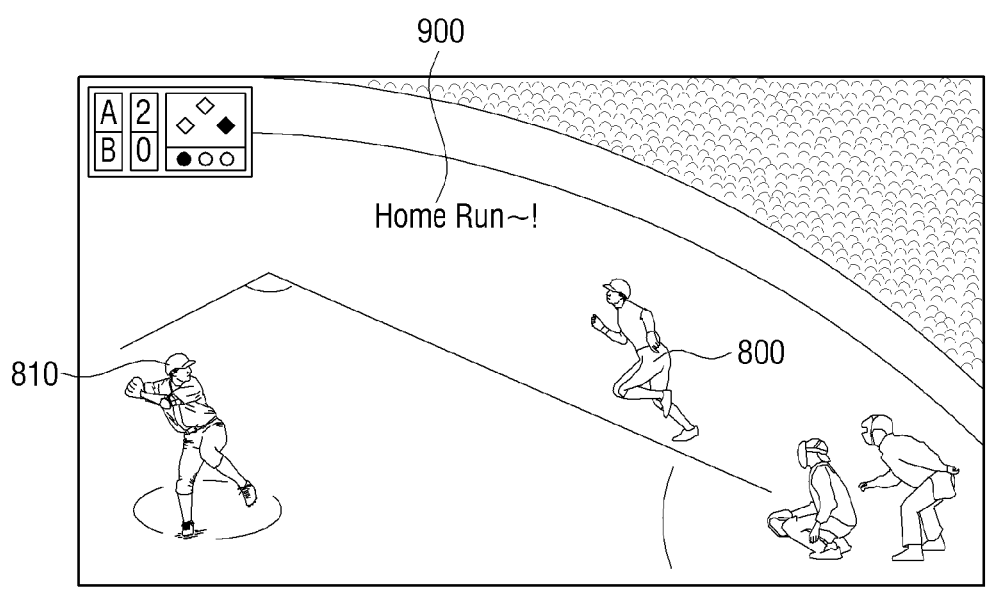
FIGS. 9A and 9B are diagrams illustrating an appearance in which when a preset event appear in the baseball game, information associated with players is displayed, according to an exemplary embodiment.
Figure 9B:
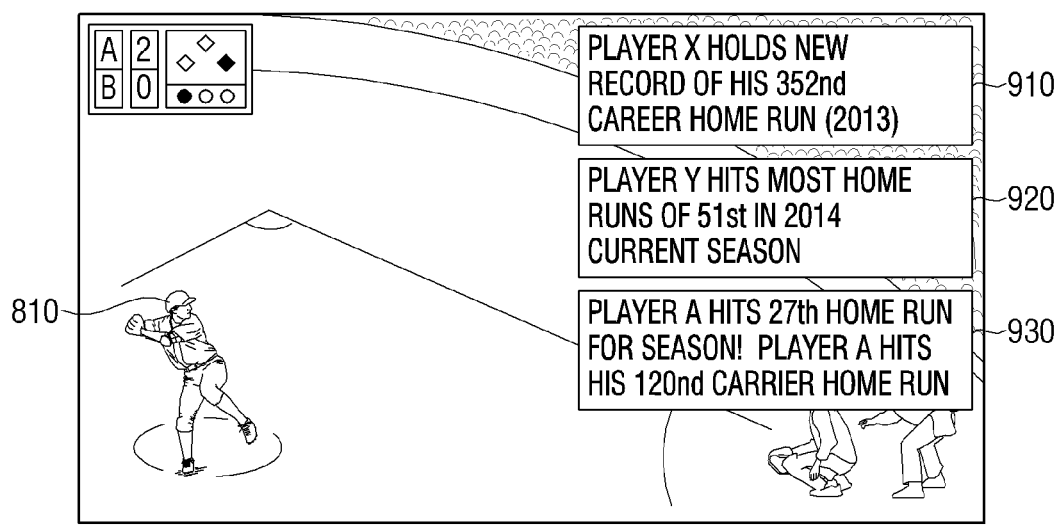

Meanwhile, FIGS. 9A and 9B illustrate diagrams for describing the example in which the image display apparatus 100 extracts text data or audio data to acquire a context and displays information corresponding to the acquired context.

That is, the image display apparatus 100 may analyze the displayed text UI to extract the text data, when the text UI is displayed depending on the event generation.

As illustrated in FIG. 9A, when the text data called 'Home Run~! 900' is displayed, the image display apparatus 100 may extract the text data to acquire a context that 'home run event' is generated during a baseball game.

In particular, as illustrated in FIG. 8A, when a context that hitter 'player X 800' is at bat is acquired and a context that the 'home run event' is generated within a preset time is acquired, the image display apparatus 100 may determine that the 'home run event' is generated by the 'player X 800'.

Therefore, the image display apparatus 100 may extract, as the additional information, 'home run record information of player X 910', 'all-time home run record in Korean professional baseball 920', and 'home run record this season 930' which correspond to the context that the 'home run event' is generated by the 'player X 800', among the additional information received from the server 200.

Further, as illustrated in FIG. 9B, the image display apparatus 100 may display the extracted additional information for a portion of the display 110 for a predetermined time.

The user may immediately receive the information corresponding to the contexts of the displayed contents by the image display apparatus 100.

Meanwhile, as described above, displaying sports contents such as a baseball game as contents by the image display apparatus 100 is only an example. Therefore, the image display apparatus 100 may display broadcasting contents, movie contents, performance contents, and contents associated with various kinds of applications.

For example, when the contents displayed by the image display apparatus 100 are the movie contents, the image display apparatus 100 may extract a title, a production year, and a director name of a movie as metadata and may extract 'information that user stores actor P as favorites' as profile information, when the image display apparatus 100 displays the movie contents. Further, the image display apparatus 100 may generate query data based on the extracted metadata and profile information.

Figure 10A:
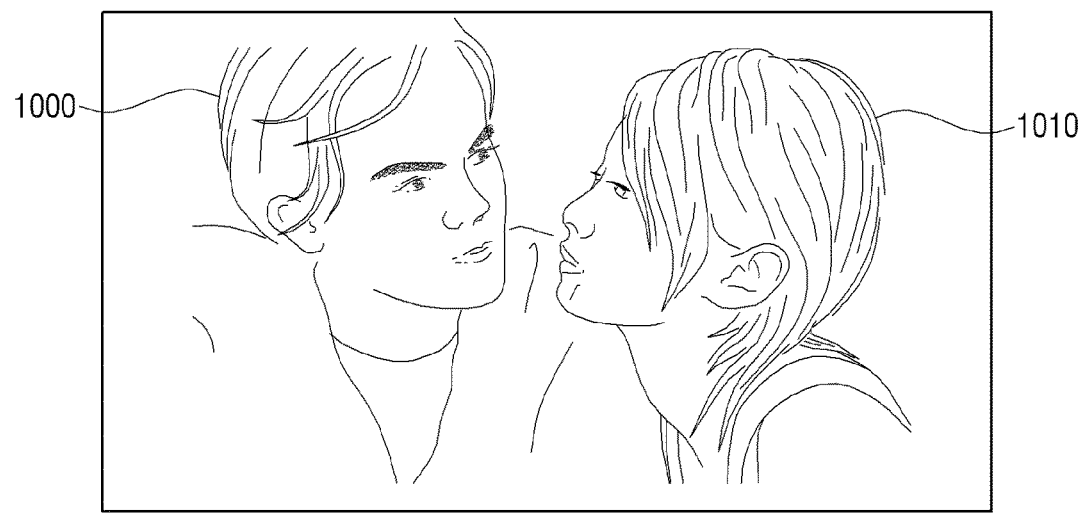
FIGS. 10A to 10C are diagrams illustrating an appearance in which when specific characters appear in image contents and a context for external environment is sensed, information associated with the specific characters is displayed, according to an exemplary embodiment.

In detail, when the movie contents are displayed as illustrated FIG. 10A, the image display apparatus 100 may generate the query data as described above and transmit the generated query data to the server 200.

Further, the image display apparatus 100 may receive the additional information corresponding to the movie contents displayed from the server 200 receiving the query data. That is, the server 200 may transmit the additional information for the displayed movie contents depending on the query data and the additional information for the 'actor P' stored as favorites by the user to the image display apparatus 100.

Figure 10B:
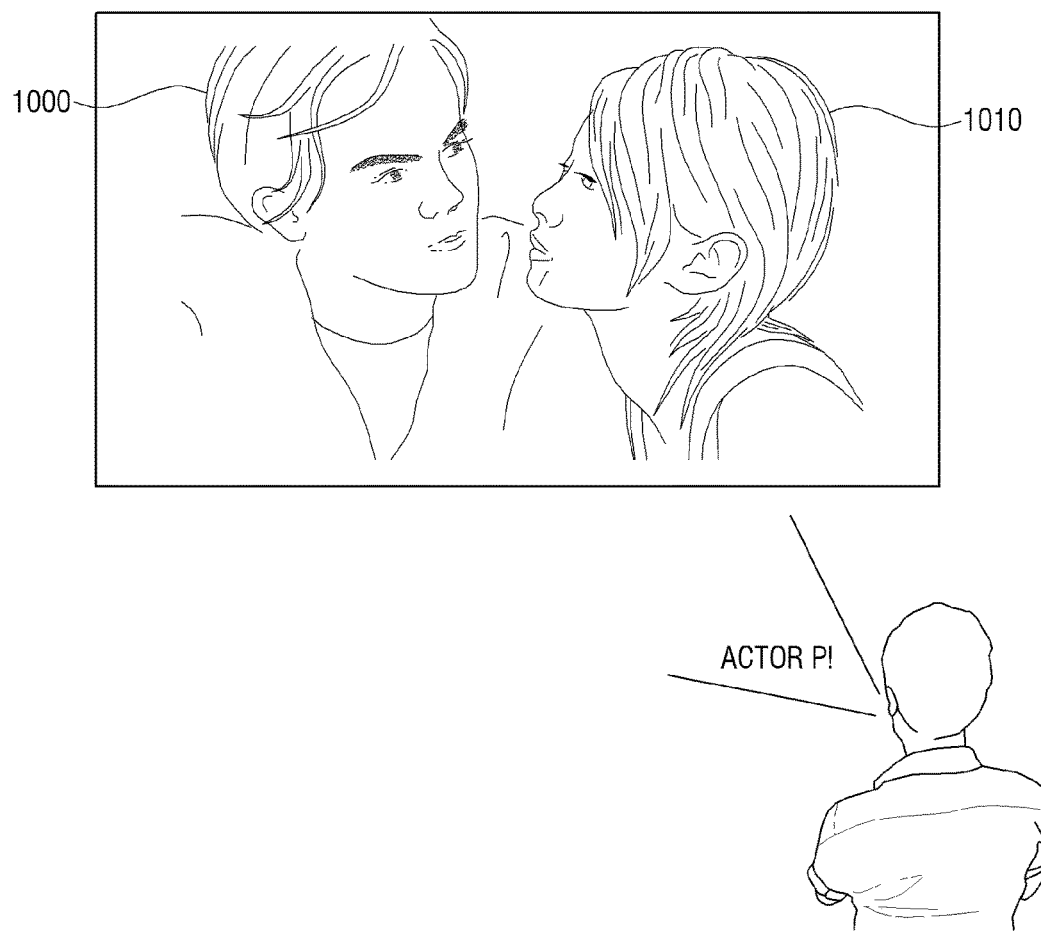
Figure 10C:
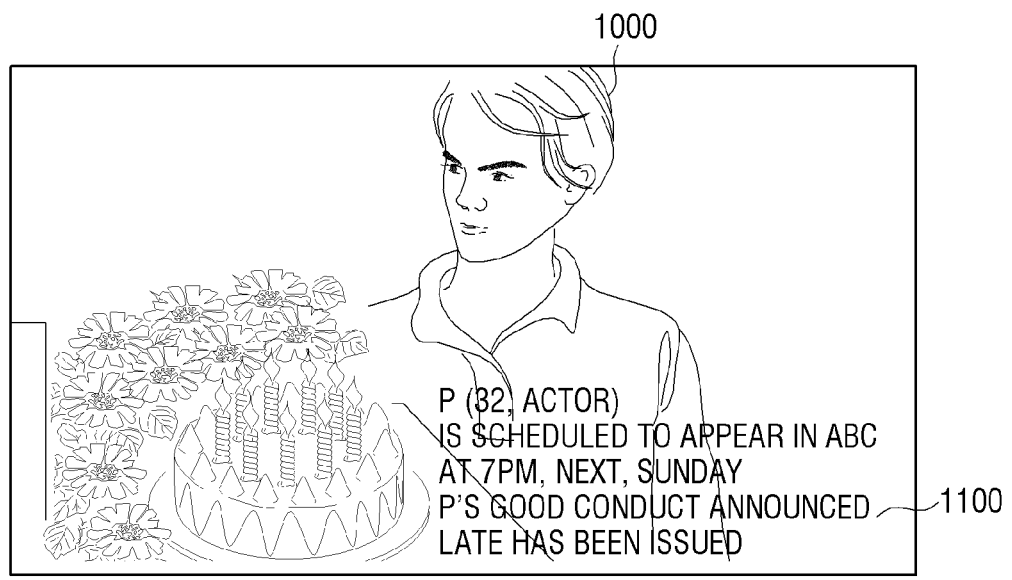

As illustrated in FIG. 10B, when the user utters a voice such as "actor P! P!", the image display apparatus 100 may analyze the input user voice to know that the user utter a name of 'actor P'.

When the context "uttering the name of the actor P by the user' is generated, the image display apparatus 100 may determine that the context 'uttering the name of the actor P by the user' corresponds to an information providing rule for providing new information and news information for the 'actor P'.

Therefore, the image display apparatus 100 may provide target information corresponding to the generation of the context 'uttering the name of the P by the user', among the additional information received from the server 200. That is, the image display apparatus 100 may provide new information, news, etc., for the 'actor P' as the target information.

In detail, as illustrated in FIG. 100, the image display apparatus 100 may display target information 1100 on 'actor P 1000' which is additional information obtained around the 'actor P 1000' displayed in the image contents.

The image display apparatus 100 may use the stored information providing history to adjust a display frequency of the target information so that the user does not feel inconvenience. For example, the image display apparatus 100 may not provide information for specific characters whenever the context that a specific character appears is generated while the movie contents are displayed but may provide information in the case in which a name of the specific character is uttered by the user, in the case in which a history providing new information for the specific character as target information is not present in an information providing history, or at a preset time interval based on the stored information providing history.

Meanwhile, the components of the image display apparatus 100 may be implemented as software. For example, although not illustrated in FIGS. 2 and 3, the image display apparatus 100 may further include a flash memory, other nonvolatile memories. The nonvolatile memories may store programs corresponding to each component.

Further, the processor 130 may be implemented in a form including a CPU (not illustrated) and a random access memory (RAM). The CPU of the processor 130 copies the programs stored in the nonvolatile memories to the RAM and then executes the copied programs to be able to automatically provide the target information as described above.

Meanwhile, an information providing method of the image display apparatus according to various exemplary embodiments as described above may be stored in a non-transitory readable medium while being coded in software. The non-transitory readable medium may be used while being equipped in various apparatuses.

The non-transitory computer readable medium is not a medium that stores data therein for a while, such as a register, a cache, a memory, or the like, but means a medium that semi-permanently stores data therein and is readable by a device. In detail, the non-transitory computer readable medium may be a CD, a DVD, a hard disc, a Blueray disc, an USB, a memory card, an ROM, etc.

As described above, according to various exemplary embodiments, it is possible to provide the image display apparatus and the information providing method thereof capable of immediately providing the information corresponding to the displayed contents.

Although the exemplary embodiments have been illustrated and described hereinabove, the embodiments are not limited to the above-mentioned specific exemplary embodiments, but may be variously modified by those of skill in the art without departing from the scope and spirit as disclosed in the accompanying claims. These modifications should also be understood to fall within the scope.

What is claimed is:

1. An image display apparatus, comprising:
    a display;
    a communicator; and
    a processor configured to:
        control the display to display a content,
        control the communicator to transmit information corresponding to the displayed content to a server,
        receive additional information corresponding to the displayed content and an information providing rule from the server via the communicator, the information providing rule being a rule for providing additional information corresponding to a context related to the displayed content,
        identify whether the context related to the displayed content is a first context related to the displayed content, a second context related to the displayed content, or a combination context related to a combination of the first context and the second context related to the displayed content based on an amount of time when a part of the content corresponding to the combination context is displayed, and
        provide additional information corresponding to the identified context from among the received additional information,
    wherein the additional information corresponding to the combination context is different from a combination of additional information corresponding to the first context and additional information corresponding to the second context, and
    wherein the processor is further configured to:
        based on the amount of time being greater than or equal to a predetermined amount of time, provide the additional information corresponding to the combination context from among the received additional information, and
        based on the amount of time being less than the predetermined amount of time, provide the additional information corresponding to the first context and the additional information corresponding to the second context from among the received additional information.

2. The image display apparatus as claimed in claim 1, further comprising:
    a storage configured to store an information providing history,
    wherein the processor is further configured to provide additional information corresponding to the identified context among the received additional information, using the stored information providing history.

3. The image display apparatus as claimed in claim 2, wherein the processor is further configured not to provide additional information corresponding to the identified context among the received additional information, based on the provided additional information being more often than a predetermined frequency or the provided additional information being within a critical time, using the stored information providing history.

4. The image display apparatus as claimed in claim 1, wherein the processor is further configured to control the communicator to generate query data based on metadata and profile information for the displayed content and transmit the generated query data to the server.

5. The image display apparatus as claimed in claim 4, wherein the profile information used to generate the query data includes at least one of user information and positional information.

6. The image display apparatus as claimed in claim 5, wherein the processor is further configured to control the communicator to use the profile information used to generate the query data to update the query data and transmit the updated query data to the server.

7. The image display apparatus as claimed in claim 1, wherein the identified context is a context based on display information, subtitle information, and audio information of the displayed content and user voice information input to the image display apparatus.

8. The image display apparatus as claimed in claim 1, wherein the processor is further configured to control the display to display the provided additional information along with the content.

9. The image display apparatus as claimed in claim 1, wherein the processor is further configured to control the communicator to transmit the provided additional information to a predetermined user terminal.

10. An information providing method of an image display apparatus, comprising:
    displaying a content;
    transmitting information corresponding to the displayed content to a server;
    receiving additional information corresponding to the displayed content and an information providing rule from the server, the information providing rule being a rule for providing additional information corresponding to a context related to the displayed content;
    identifying whether the context related to the displayed content is a first context related to the displayed content, a second context related to the displayed content, or a combination context related to a combination of the first context and the second context related to the displayed content based on an amount of time when a part of the content corresponding to the combination context is displayed; and
    providing additional information corresponding to the identified context from among the received additional information,
    wherein the additional information corresponding to the combination context is different from a combination of additional information corresponding to the first context and additional information corresponding to the second context, and
    wherein the providing further comprises:
        based on the amount of time being greater than or equal to a predetermined amount of time, providing the additional information corresponding to the combination context from among the received additional information; and
        based on the amount of time being less than the predetermined amount of time, providing the additional information corresponding to the first context and the additional information corresponding to the second context from among the received additional information.

11. The information providing method as claimed in claim 10, further comprising:
    storing an information providing history,
    wherein in the providing, additional information corresponding to the identified context among the received additional information is provided, using the stored information providing history.

12. The information providing method as claimed in claim 11, wherein in the providing, the additional information corresponding to the identified context among the received additional information is not provided, based on the provided additional information being more often than a predetermined frequency or the provided additional information being within a critical time, using the stored information providing history.

13. The information providing method as claimed in claim 10, further comprising:
    generating query data based on metadata and profile information for the displayed content and transmitting the generated query data to the server.

14. The information providing method as claimed in claim 13, wherein the profile information used to generate the query data includes at least one of user information and positional information.

15. The information providing method as claimed in claim 14, further comprising:
    updating the query data using the profile information used to generate the query data and transmitting the updated query data to the server.

16. The information providing method as claimed in claim 10, wherein the identified context is a context based on display information, subtitle information, and audio information of the displayed content and user voice information input to the image display apparatus.

17. A non-transitory computer readable medium recorded with a program code for executing the information providing method as claimed in claim 10.

* * * * *